United States Patent
Hunt (12)

(10) Patent No.: US 9,210,978 B1
(45) Date of Patent: Dec. 15, 2015

(54) EQUIPMENT CARRIER WITH EXTENSIBLE TETHER

(75) Inventor: Fred H. Hunt, Eugene, OR (US)

(73) Assignee: FL Archery Holdings LLC, Superior, WI (US)

(*) Notice: Subject to any disclaimer, the term of this patent is extended or adjusted under 35 U.S.C. 154(b) by 1161 days.

(21) Appl. No.: 13/180,549

(22) Filed: Jul. 12, 2011

(51) Int. Cl.
*A45F 3/04* (2006.01)
*A45C 11/38* (2006.01)
*A45C 11/08* (2006.01)

(52) U.S. Cl.
CPC .............. *A45C 11/38* (2013.01); *A45C 11/08* (2013.01)

(58) Field of Classification Search
CPC  A45C 11/08; A45C 11/38; A45F 2200/0533; A45F 2003/045
USPC ......... 224/162, 242, 262, 254, 908, 909, 268, 224/458, 651; 248/693, 610
See application file for complete search history.

(56) References Cited

U.S. PATENT DOCUMENTS

| 3,307,757 | A | | 3/1967 | Gatos et al. |
| 3,547,323 | A | * | 12/1970 | Sledge Jr. et al. ............. 224/162 |
| 3,782,614 | A | | 1/1974 | Campisi |
| 5,016,797 | A | | 5/1991 | Rowledge |
| 5,172,838 | A | | 12/1992 | Rowell et al. |
| 5,323,942 | A | | 6/1994 | Dahan |
| 5,524,749 | A | * | 6/1996 | Thompson et al. ............. 206/38 |
| 6,471,054 | B2 | | 10/2002 | Nevarez |
| 6,926,184 | B2 | | 8/2005 | Hancock et al. |
| 7,059,503 | B2 | | 6/2006 | Andersen |
| 2006/0151563 | A1 | | 7/2006 | Bussard |
| 2007/0152007 | A1 | | 7/2007 | Kauss et al. |
| 2010/0052931 | A1 | * | 3/2010 | Kolpasky et al. ............. 340/670 |

* cited by examiner

*Primary Examiner* — Adam Waggenspack
(74) *Attorney, Agent, or Firm* — Covington & Burling LLP; Gregory S. Discher; Grant D. Johnson

(57) ABSTRACT

An equipment carrier comprises one or more support members, an equipment holder, and an extensible tether. The equipment holder receives and retains an equipment item. The support members support the equipment holder against a wearer's torso or limb. The extensible tether is attached to the carrier is attached to the equipment item. The extensible tether is under tension and elongated when the equipment item retained by the equipment holder, and is under negligible tension and not elongated the equipment item held by the wearer at the wearer's face or head.

11 Claims, 5 Drawing Sheets

EQUIPMENT CARRIER WITH EXTENSIBLE TETHER

BACKGROUND

The field of the present invention relates to equipment carriers. In particular, an equipment carrier is disclosed herein that includes an elastic tether.

A wide variety of carriers for binoculars, cameras, and other equipment have been developed previously. Some of these are disclosed in:

U.S. Pat. No. 3,307,757 entitled "Binocular carrier" issued Mar. 7, 1967 to Gatos et al;
U.S. Pat. No. 3,782,614 entitled "Binocular pocket" issued Jan. 1, 1974 to Campisi;
U.S. Pat. No. 5,016,797 entitled "Article carrier" issued May 21, 1991 to Rowledge;
U.S. Pat. No. 5,172,838 entitled "Chest pouch camera carrier" issued Dec. 22, 1992 to Rowell et al;
U.S. Pat. No. 5,323,942 entitled "Photographic equipment pack" issued Jun. 28, 1994 to Dahan;
U.S. Pat. No. 6,471,054 entitled "Soft-sided sports bag for carrying outdoor sports and activities accessories" issued Oct. 29, 2002 to Nevarez;
U.S. Pat. No. 6,926,184 entitled "Suspended article cover hold down system" issued Aug. 9, 2005 to Hancock et al;
U.S. Pat. No. 7,059,503 entitled "Device for restraining and protecting neckstrap-supported user equipment" issued Jun. 13, 2006 to Andersen;
U.S. Pat. Pub. No. 2006/0151563 entitled "Wearable device-securing system" published Jul. 13, 2006 in the name of Bussard; and
U.S. Pat. Pub. No. 2007/0152007 entitled "Modular pack system" published Jul. 5, 2007 in the names of Kauss et al.

SUMMARY

An equipment carrier comprises one or more support members, an equipment holder, and an extensible tether. The equipment holder is arranged to receive and retain an equipment item. The one or more support members are arranged to support the equipment holder against a wearer's torso or limb. The extensible tether is attached to at least one of the support members and is arranged to be attached to the equipment item.

The equipment holder, the one or more support members, and the tether are arranged so that, with (i) the one or more support members supporting the equipment holder against the wearer's torso or limb, (ii) the tether attached to the equipment item, and (iii) the equipment item retained by the equipment holder, the extensible tether is under tension and elongated substantially beyond its rest length. The one or more support members and the tether are arranged so that, with (i) the one or more support members supporting the equipment holder against the wearer's torso or limb, (ii) the tether attached to the equipment item, and (iii) the equipment item held by the wearer at the wearer's face or head, the extensible tether is under negligible tension and not elongated substantially beyond its rest length.

Objects and advantages pertaining to equipment carriers may become apparent upon referring to the exemplary embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It should be noted that the embodiments depicted in this disclosure are shown only schematically, and that not all features may be shown in full detail or in proper proportion. Certain features or structures may be exaggerated relative to others for clarity. It should be noted further that the embodiments shown are exemplary only, and should not be construed as limiting the scope of the written description or appended claims.

DETAILED DESCRIPTION OF EMBODIMENTS

Figure 1:
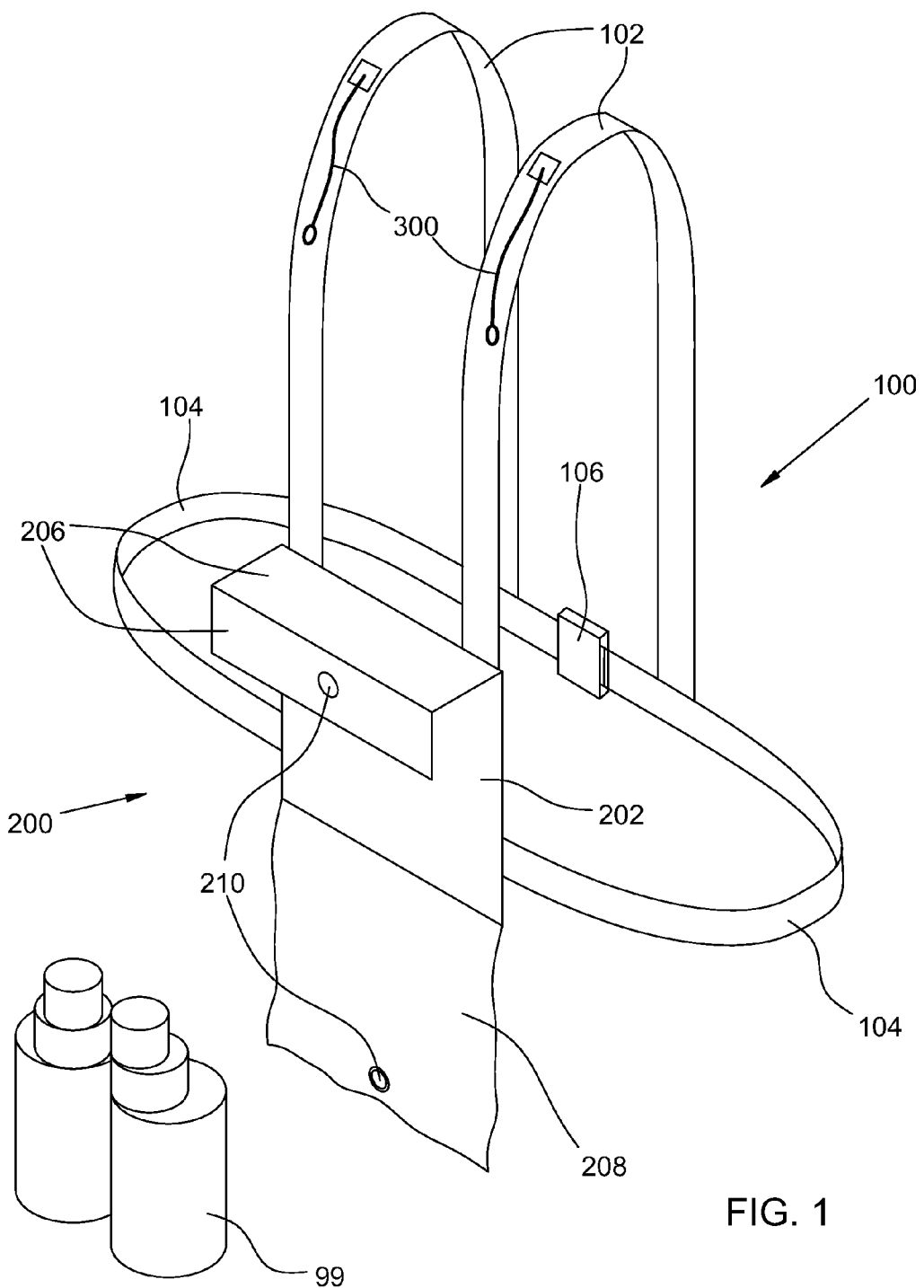
FIGS. 1, 2, and 3 illustrate schematically an equipment carrier according to the present disclosure.
Figure 2:
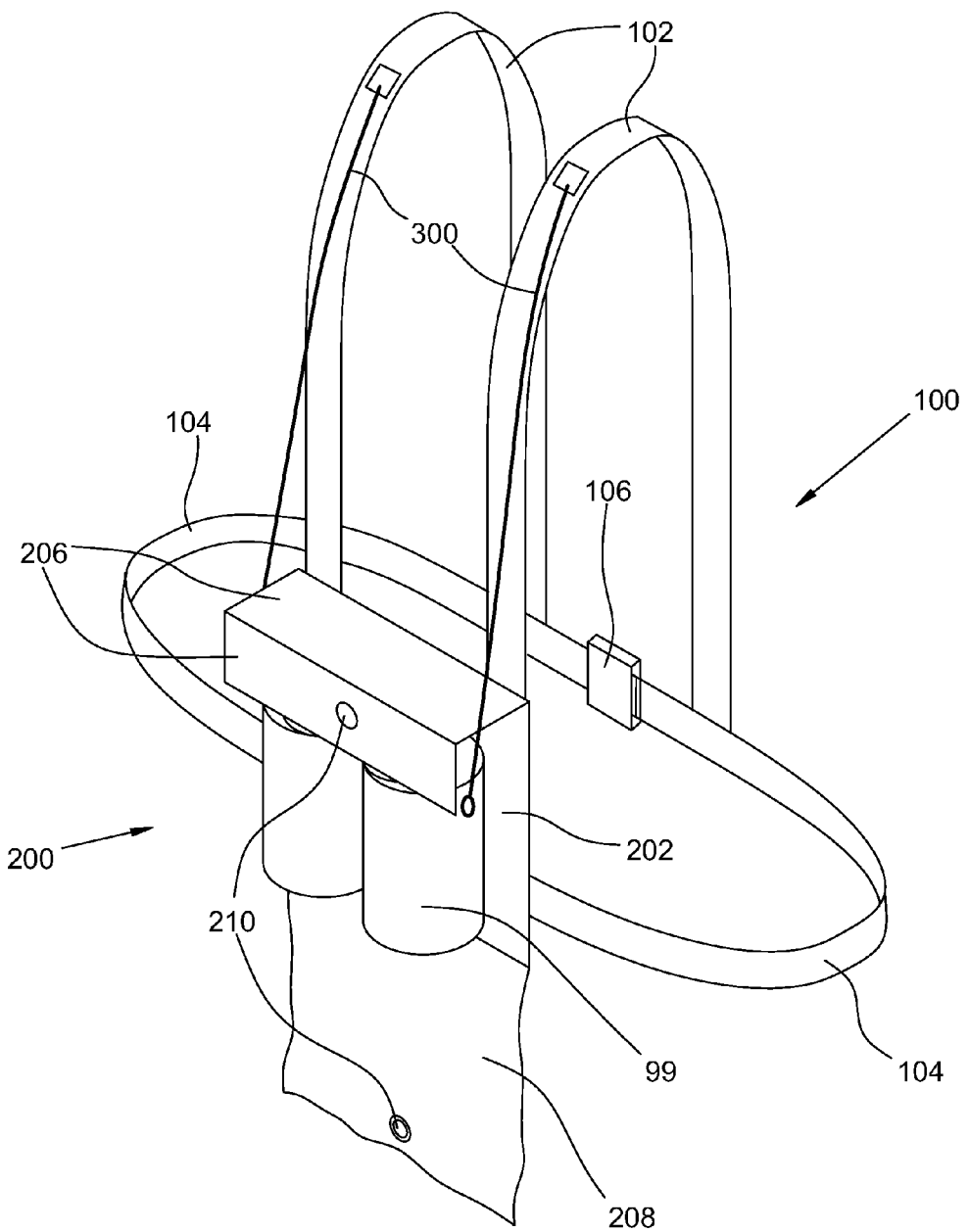
Figure 3:
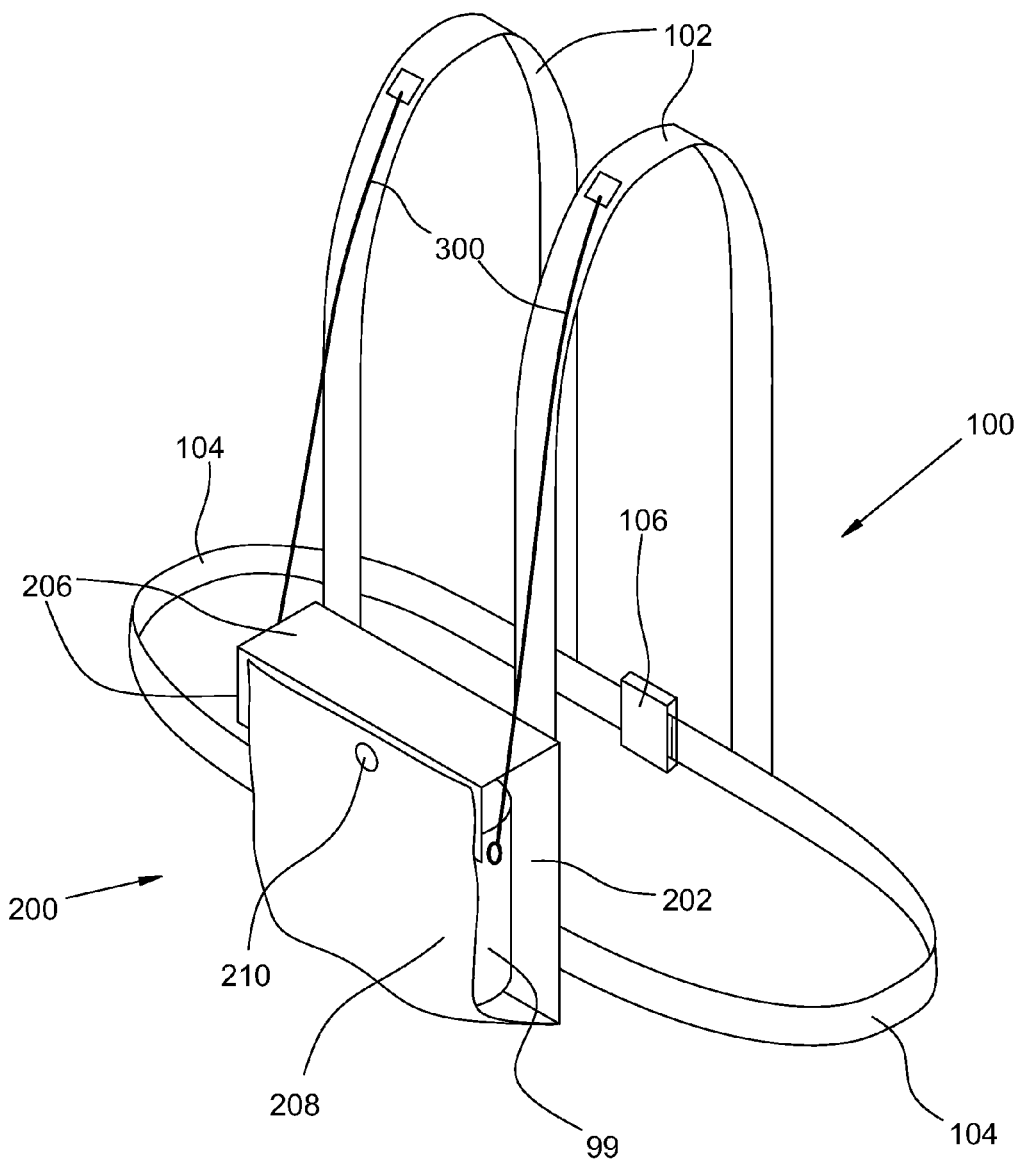

In one example of an equipment carrier as schematically illustrated in FIGS. 1-3, a set 100 of support members includes a pair of shoulder straps 102, a waist strap 104, and a buckle 106. Any suitable materials can be employed (e.g., nylon or canvas), in any suitable arrangement (e.g., using ties, buckles, or other closures; including different or additional straps). An equipment holder 200 is attached to one or more of the straps 102/104 so as to be supported against a wearer's chest or belly, within easy reach. More generally, the equipment holder 200 can be held by a set 100 of support members at any convenient or suitable position against the wearer's torso or limb. The position of the equipment holder 200 (e.g., its height) can be fixed or adjustable on the support members 100; if adjustable, adjustment can be (i) through adjustment of strap lengths or (ii) by a point of attachment to the support members that is movable along one or more of the straps. One or more extensible tethers 300 are attached to one or more of the support members (e.g., shoulder straps 102) or to the holder 200 and are arranged to be attached to an equipment item 99 (e.g., a pair of binoculars, a laser rangefinder, a camera, or other equipment item). A pair of tethers 300 are shown in FIGS. 1-5; any necessary, suitable, or desirable number of one or more tethers can be employed. Instead of a dedicated set of straps 102/104, the equipment holder 200 can be attached to a typical backpack, a safety vest or utility vest, a utility belt, a safety harness, a hydration pack with a bladder, or other garments or equipment that can be worn by a wearer.

The equipment holder 200 comprises a back panel 202 and a top front panel 206, and can further include a flexible bottom front panel 208. The flexible bottom front panel 208 is attached to a lower portion of back panel 202 and can fold upward to be releasably attached to the top front panel 206. The equipment holder 200 can be sized to accommodate the equipment item 99 between the various panels of the equipment holder 200 with the bottom front panel 208 folded upward and attached to top front panel 206. Any equipment item 99 desired to be kept within easy reach can be held within equipment holder 200, such as a pair of binoculars, a laser rangefinder, a camera, or some other piece of equipment.

The back panel 202 and top front panel 206 preferably form a substantially rigid bracket that nevertheless exhibits a small degree of elastic deformability. The bracket can be arranged to provide an interference fit when the equipment item 99 is inserted between panel 202 and a front portion of panel 206, and the deformability enables the bracket to accommodate the equipment item 99 and helps to retain it in the equipment holder 200.

Once the equipment item 99 is inserted between the panels 202 and 206, the bottom front panel 208 is pulled forward beneath the equipment item 99 and upward in front of the equipment item. The bottom front panel 208 is attached to the top front panel 206 by any suitable fastener or closure mechanism (e.g., snap 210, hook-and-loop, magnet, and so on). In that closed arrangement, the panels 202, 206, and 208 enclose the equipment item in front, behind, above, and below and hold it in the holder 200. The equipment item 99 can be left exposed on the sides, thereby providing the user with access to grasp it while detaching the bottom front panel 208 from the top front panel 206 to release the equipment item 99 from the holder 200. The flexible bottom front panel 208 can comprise multiple substantially rigid segments connected by one or more flexible joints or can comprise a single flexible sheet having no rigid portion at all.

Optionally, equipment carrier can include additional pockets, pouches, quick-detach sockets, or attachment points to carry other objects (in addition to the equipment item 99 in equipment holder 200). Such pockets, pouches, sockets, or attachment points can be located anywhere suitable on the equipment holder 200, such as on back panel 202 or top front panel 206, or on the set 100 of support members 102/104 (or backpack, safety harness, etc.).

An extensible tether 300 can be attached in any suitable way to the equipment holder 200 or to the support members 102/104 (e.g., tied, stitched, stapled, tacked, riveted, glued, buckled, latched, clamped, secured by hook-and-loop, and so on). The extensible tether 300 can be arranged or adapted to be attached in any suitable way to the equipment item 99 (e.g., tied around the item, looped through an eyelet or similar structure on the item, attached to a case or sleeve for the item, attached to a mounting plate secured to the item, and so on). The tether 300 is provided, e.g., to prevent dropping of the equipment item 99 when it is removed from within the holder 200 (for example, to be used by the wearer). The extensible tether 300 can comprise an elastic material (e.g., shock or bungee cord, elastic polymer or other suitable elastic material) that has a desired rest length when under negligible tension but that can be lengthened when under tension. Alternatively, the extensible tether can comprise a retractable tether, e.g., on a spring-loaded spool or other suitable extension/retraction mechanism. Such a mechanism can be arranged to enable the tether to be extended under tension and to be retracted when that tension is sufficiently reduced, and can include a stop that prevents further retraction of the tether once it is retracted to a desired rest length.

Figure 4:
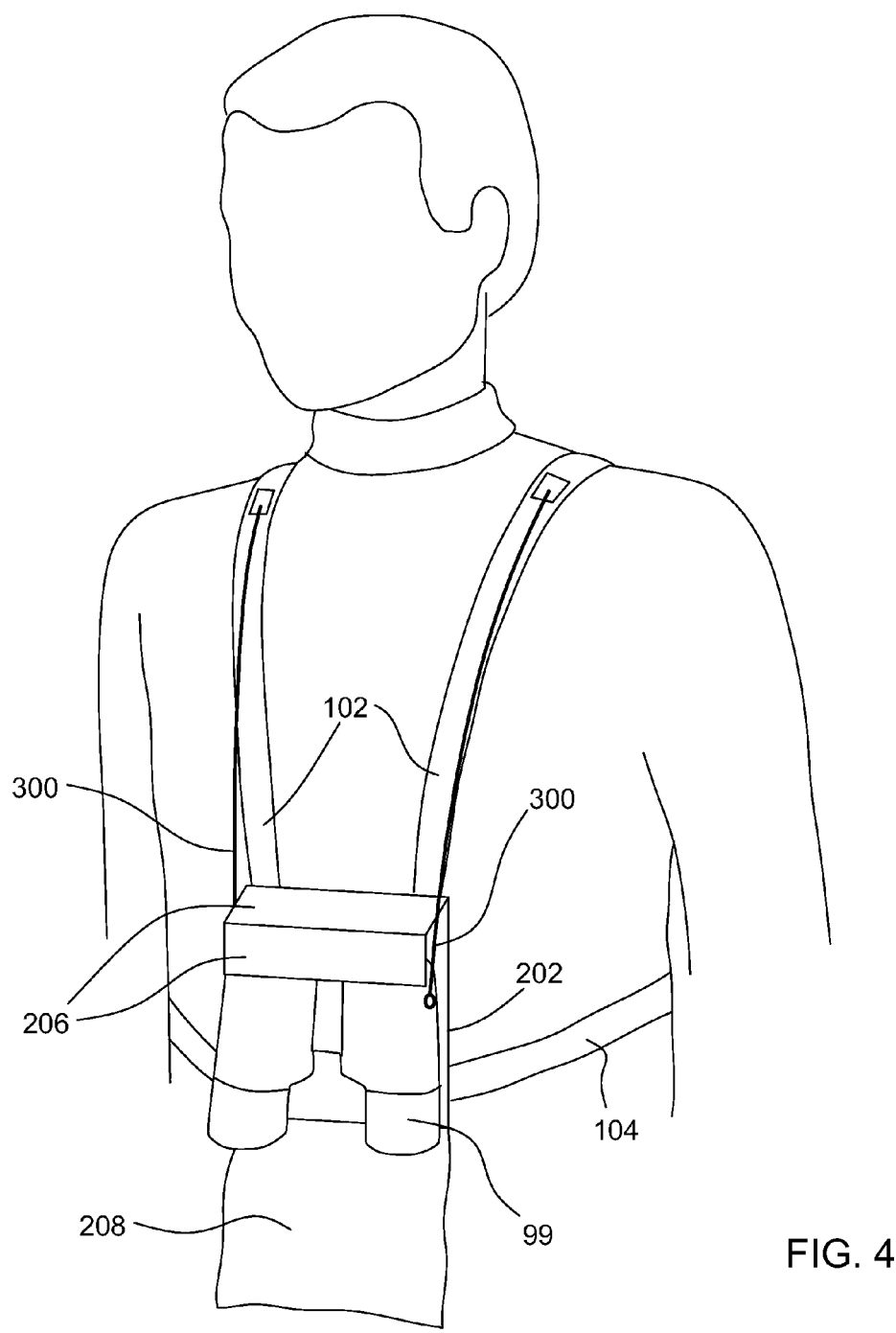
FIG. 4 illustrates schematically the equipment carrier being worn with an equipment item held in the holder.
Figure 5:
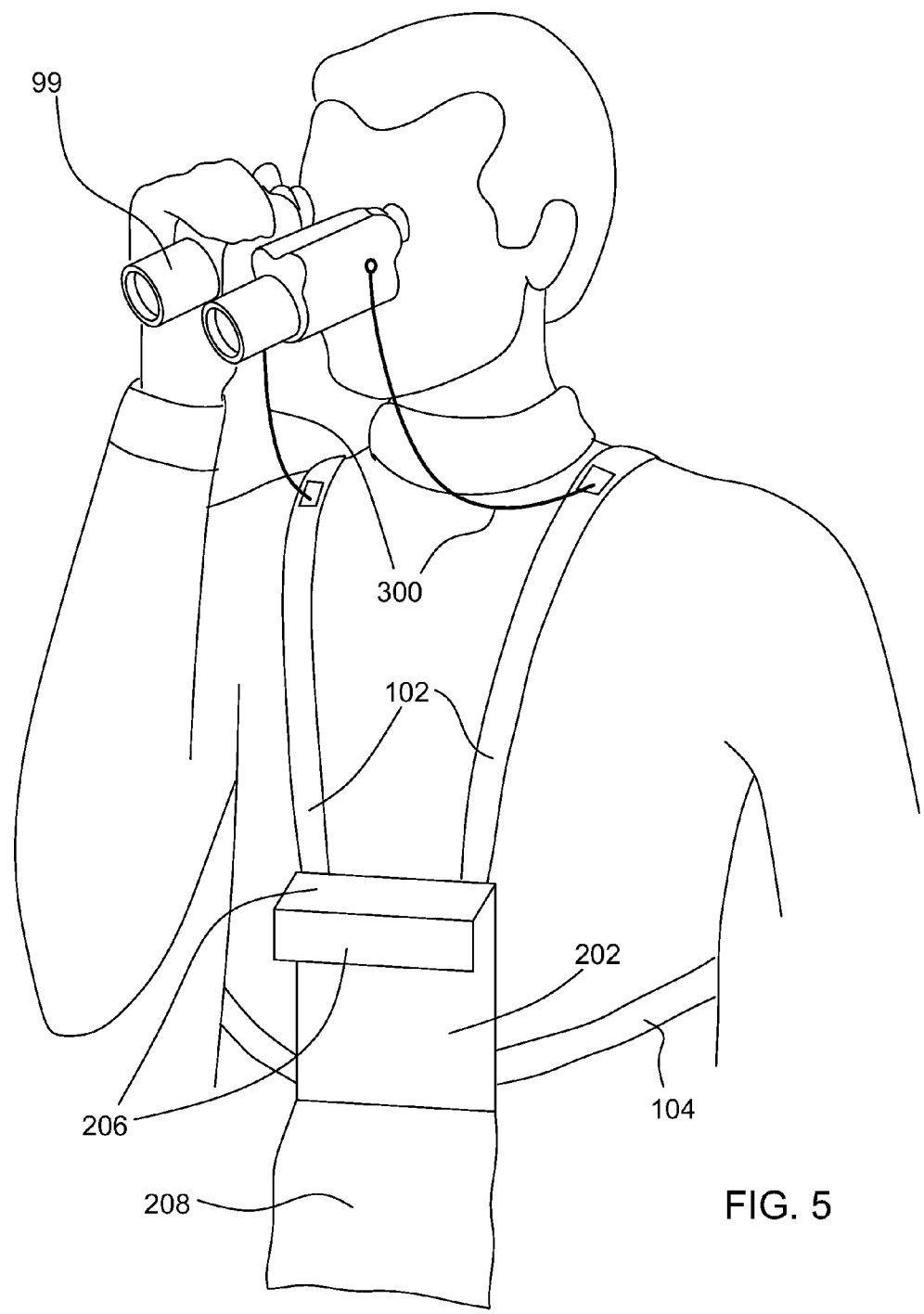
FIG. 5 illustrates schematically the equipment carrier being worn with the equipment item held at the wearer's eyes.

Whatever the specific arrangement of the extensible tether 300, the equipment holder 200, the one or more support members 102/104, and the tether 300 are arranged so that, (i) with the one or more support members supporting the equipment holder against the wearer's torso or limb, (ii) with the tether attached to the equipment item, and (iii) with the equipment item retained by the equipment holder, the extensible tether 300 is under tension and extended substantially beyond its rest length (as in FIG. 4). The one or more support members and the tether are further arranged so that, (i) with the one or more support members supporting the equipment holder against the wearer's torso or limb, (ii) with the tether attached to the equipment item, and (iii) with the equipment item held by the wearer at the wearer's face or head, the extensible tether is under negligible tension and not extended substantially beyond its rest length (as in FIG. 5).

The arrangement described in the previous paragraph provides several advantages. The elongation of and tension on the extensible tether 300 with the equipment item 99 held by the equipment holder 200 can serve to retain the equipment item 99 in the holder 200. For example, one advantageous arrangement includes attachment of the extensible tether 300 to one or more of the straps 102 at a point above the holder 200, so that tension on the tether 300 (elongated beyond its rest length) urges the equipment item 99 upward into the bracket formed by the back panel 202 and the top front panel 206 (as in FIG. 4). However, that arrangement also enables the equipment item 99 to be held at or near the wearer's face or head with the extensible tether 300 at its rest length and under negligible tension (as in FIG. 5). That is advantageous, for example, so as to allow the wearer to use the equipment (e.g., by holding binoculars or a camera in front of his eyes) without having to exert force against tension in the tether 300.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets of one or more features that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

What is claimed is:

1. An equipment carrier comprising:
   i) a first shoulder strap;
   ii) a second shoulder strap;
   iii) a waist strap, wherein the waist strap is connected to both a first end and a second end of the first shoulder strap and a first end and a second end of the second shoulder strap, and a first end of the waist strap is connected to the second end of the waist strap via a buckle;
   iv) a first extensible tether, wherein a first end of the first extensible tether is attached to the first shoulder strap, and a second end of the first extensible tether is attached to an equipment item;
   v) a second extensible tether, wherein a first end of the second extensible tether is attached to the second shoulder strap, and a second end of the second extensible tether is attached to the equipment item; and
   vi) an equipment holder attached to the first shoulder strap, the second shoulder strap, and the waist strap, the equipment holder comprising:
      a) a top front panel;
      b) a back panel connected to the top front panel to form a substantially rigid bracket; and
      c) a flexible bottom panel connected to the back panel, wherein the flexible bottom panel can fold upward to be releasably attached to the top front panel by a fastener;
   wherein the first and second extensible tethers can be extended substantially beyond a rest length of the first and second extensible tethers when the first and second extensible tethers are under tension, and the tension in the first and second extensible tethers retains the equipment item in the equipment holder by forcing the equipment item upward against the substantially rigid bracket formed by the top front panel and back panel, and
   wherein the first extensible tether and the second extensible tether are not extended substantially beyond a rest length of the first and second extensible tethers and are under negligible tension when the equipment item is not retained within the equipment holder and is positioned near the face or head of a wearer of the equipment carrier.

2. The equipment carrier of claim 1, wherein the fastener is selected from the group consisting of a snap, a hook-and-loop, and a magnet.

3. The equipment carrier of claim 1, wherein the substantially rigid bracket is elastically deformed so that the equipment item is retained within the equipment holder via an interference fit.

4. The equipment carrier of claim 1, wherein the equipment item is selected from the group consisting of a pair of binoculars, a laser rangefinder, and a camera.

5. The equipment carrier of claim 1, wherein the first and second extensible tethers are comprised of an elastic material.

6. The equipment carrier of claim 5, wherein the elastic material comprises a bungee cord or an elastic polymer.

7. The equipment carrier of claim 1, wherein the first and second extensible tethers comprise retractable tethers.

8. The equipment carrier of claim 7, wherein the retractable tethers comprise spring-loaded spools.

9. The equipment carrier of claim 7, wherein each retractable tether comprises a stop that prevents retraction of the tether once the tether is retracted to a desired length.

10. The equipment carrier of claim 1, wherein the equipment holder comprises at least one pocket, pouch, quick-detach socket, or attachment point.

11. An equipment carrier comprising:
   i) a first shoulder strap, wherein the first shoulder strap is comprised of nylon or canvas;
   ii) a second shoulder strap, wherein the first shoulder strap is comprised of nylon or canvas;
   iii) a waist strap, wherein the waist strap is connected to both a first end and a second end of the first shoulder strap and a first end and a second end of the second shoulder strap, and a first end of the waist strap is connected to the second end of the waist strap via a buckle;
   iv) a first extensible tether, wherein a first end of the first extensible tether is attached to the first shoulder strap, and a second end of the first extensible tether is attached to an equipment item, and wherein the first extensible tether comprises a shock or bungee cord or a spring-loaded spool;
   v) a second extensible tether, wherein a first end of the second extensible tether is attached to the second shoulder strap, and a second end of the second extensible tether is attached to the equipment item, and wherein the first extensible tether comprises a shock or bungee cord or a spring-loaded spool;
   vi) an equipment holder attached to the first shoulder strap, the second shoulder strap, and the waist strap, the equipment holder comprising;
      a) a top front panel;
      b) a back panel connected to the top front panel to form a substantially rigid bracket, the substantially rigid bracket having a small degree of elastic formability so as to provide an interference fit with the equipment item; and
      c) a flexible bottom panel connected to the back panel, wherein the flexible bottom panel can fold upward to be releasably attached to the top front panel by a fastener, wherein the fastener comprises a snap, a hook-and-loop, or a magnet; and
   vii) one or more pockets, pouches, quick-detach sockets, or attachment points to carry other objects, wherein the one or more pockets, pouches, quick-detach sockets, or attachment points are attached to the equipment holder, the first shoulder strap, the second shoulder strap, or the waist strap;
   wherein the equipment item is selected from the group consisting of a pair of binoculars, a laser rangefinder, and a camera,
   wherein the first and second extensible tethers can be extended substantially beyond a rest length of the first and second extensible tethers when the first and second extensible tethers are under tension, and the tension in the first and second extensible tethers retains the equipment item in the equipment holder by forcing the equipment item upward against the substantially rigid bracket formed by the top front panel and back panel, and
   wherein the first and second extensible tethers are not extended substantially beyond the rest length of the first and second extensible tethers and are under negligible tension when the equipment item is not retained within the equipment holder and is positioned near the face or head of a wearer of the equipment carrier.

* * * * *